Dec. 10, 1963    W. C. WEBER ETAL    3,114,071
ELECTRON DISCHARGE DEVICE HAVING IMPROVED ELECTRODE SUPPORT
Filed March 21, 1960

INVENTORS
Walter C. Weber &
Douglas G. Noiles
BY
ATTORNEY

3,114,071
ELECTRON DISCHARGE DEVICE HAVING IMPROVED ELECTRODE SUPPORT
Walter C. Weber, Newark, N.J., and Douglas G. Noiles, Bath, N.Y., assignors to Westinghouse Electric Corporation, East Pittsburgh, Pa., a corporation of Pennsylvania
Filed Mar. 21, 1960, Ser. No. 16,383
4 Claims. (Cl. 313—350)

This invention relates to electron discharge devices and more particularly to improvements in electrode supports thereof.

One of the major problems encountered in manufacturing certain electron tubes is that of maintaining the electrode elements in the proper spaced relation. A grid electrode normally has two or more side rods or supports, which are shaped to position the electrode with respect to a perforated spacer. The problem of positioning electrodes is particularly pronounced in those applications wherein the lateral wires of two or more grids must be aligned. Thus in beam power amplifier tubes, such as the 12DQ6, it is important that grid numbers 1 and 2 have their lateral wires aligned. The reason for this alignment is to shield grid 2 from the cathode by means of grid 1. To accomplish the alignment between grids 1 and 2 of this beam power amplifier, it has been the practice for the assembly operator to manually locate the two grids with respect to each other. This normally requires the use of some type of magnifying system. This type of operation is highly skilled and even then is subject to operator error. After the two grids have been aligned by the operator, metallic tabs which are secured to one of the insulating spacers are welded to the grid support rods in order to accurately position and maintain the alignment between the two grid members.

It is accordingly an object of this invention to provide a physically substantial locating surface on a grid support rod which will resist the thrust forces encountered during assembly of the top spacer onto the support rod. This is particularly true with support rods of .025 inch diameter and smaller where conventional locating surfaces allow themselves to be pushed through the insulator, thereby allowing the end lateral wire turn to contact mica and be distorted.

It is another object to provide an improved locating means on the side rod of a grid.

It is another object to provide means of accurately aligning the laterals of two adjacent grid electrodes.

It is a further object to provide means in the form of locating shoulders on the grid support legs for accurately positioning two electrodes with respect to grid lateral members.

It is another object to provide locating shoulders of known accurate dimensions on grid support legs.

It is another object to provide improved locating shoulders on grid support rods to permit automatic mechanical lineup of laterals of at least two grid electrodes.

It is another object to provide locating shoulders on grid support rods so that two grid electrodes may be seated against the spacer member so that the grid laterals will be accurately aligned.

It is another object to provide a locating shoulder on a grid support rod which is accurately located and positioned with respect to the lateral wires on the grid electrode.

These and other objects are effected by our invention as will be apparent from the following description taken in accordance with the accompanying drawings throughout which like reference characters indicate like parts, and in which.

Figure 1:
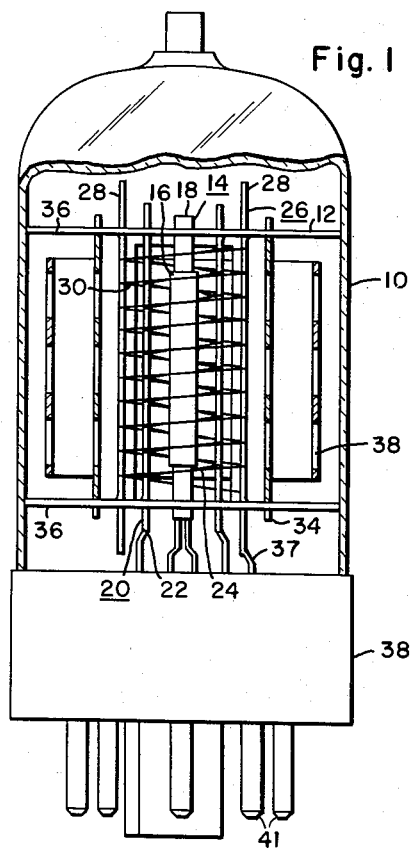
FIGURE 1 is a view partly in section of an electron tube having two grids made in accordance with the teachings of our invention.
Figure 2:
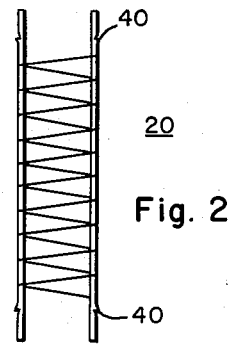
FIG. 2 shows in elevation one of the grid electrodes employed in FIG. 1.
Figure 3:
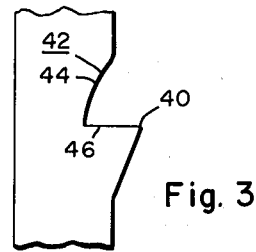
FIG. 3 is an enlarged view of one of the shoulder locating surfaces as is illustrated in FIGS. 1 and 2; and, FIG. 4 illustrates a method of forming the shoulder locating surface on the side rod of the grid electrode shown in FIG. 2.

Referring now to FIG. 1, there is shown an electron tube having a generally tubular-shaped envelope 10 enclosing an electrode mount 12. The electrode mount or cage 12 includes a cathode 14. The cathode 14 consists of a sleeve member 16 having an electron emissive coating on the outer surface thereof and a heater 18 within the sleeve 16. A wound grid electrode 20 surrounding the cathode 14 is the first grid and includes two parallel side rod members 22 and a plurality of parallel lateral grid wires 24 supported and secured thereon. A second grid electrode 26 surrounds the first grid 20 and also consists of two parallel side rod members 28 and a plurality of parallel lateral wires 30 supported and secured thereon. The two grids 20 and 26 are prepared in conventional manner. One method is to form the grid on a rotary type grid machine in which the side rod members are rotated while the lateral wires are wound thereon and secured by notching and peening. In this specific embodiment shown, the pitch of the lateral wires on the two grids 20 and 26 is the same and as shown in FIG. 1, the lateral wires 24 and 30 are aligned. The spacing between the laterals is enlarged and the number of turns reduced in FIG. 1 and FIG. 2 for purposes of illustration. In one specific tube type, 40 turns of lateral wire are provided per inch. The diameter of the grid wire or lateral wire would be about .003 inch and the accuracy of location of the laterals of each of the two grids to effect the alignment might be plus or minus .001 inch.

A beam forming electrode 34 is positioned exterior of the second grid 26 and an anode 38 is positioned around the beam forming electrode 34 to collect the electrons emitted from the cathode 14 after passing through the grids 20, 26 and the beam forming electrode 34. Two parallel insulating spacer plates 36 of a suitable material such as mica and having a plurality of apertures therein are positioned on opposite ends of the electrode members and the electrode members are secured therebetween by suitable means well known in the art to form the electrode cage 12. The outer periphery of the spacer members 36 is serrated and rests against the envelope wall 10 to aid in positioning the electrode mount 12 within the envelope 10. The electrode mount 12 is also supported by lead-ins 37 from the base portion 38 of the envelope 10. The lead-ins 37 also supply the voltages to the electrodes within the envelope and are connected to exterior pins 41.

Referring now in more detail to the construction of the two grid members, the side rod members 22 of grid 20 are of a suitable material such as nickel-plated iron having a circular cross section and of a diameter of about .040 inch. The side rods 28 of the grid 26 are of circular cross section of a diameter of about .040 inch and of a suitable material such as chrome copper. A locating shoulder or projection 40 is provided near the end of each side rod between the lateral wires and the end of the rod and the distance between the locating shoulder 40 and the adjacent lateral wire is of equal distance in both grids so that when the locating shoulders are positioned against the mica spacer 36, the lateral wires in the two grids will be accurately aligned. The shoulders 40 located at one end of the grid lie in a plane perpendicular to the side rods.

The locating shoulders 40 are formed by a chisel-like cut being made into the outside surface of the grid side rod. The cut is made into the side rod at an acute angle with respect to the longitudinal axis of the grid support rod with the leading edge of the working tool forcing the material with respect to the working tool downward and outward forming the locating shoulder 40 which projects beyond the surface of the grid side rod and lies in a plane substantially perpendicular to the longitudinal axis of the side rod. The resulting structure may be defined to be comprised of a notch portion 42 comprised of two surfaces 44 and 46. The surface 44 lies in a plane positioned at an acute angle with respect to the longitudinal axis of the side rod and the other surface 46 lying in a plane substantially perpendicular to the longitudinal axis of the side rod with a projecting shoulder portion 40 coplanar with the surface 46.

Figure 4:
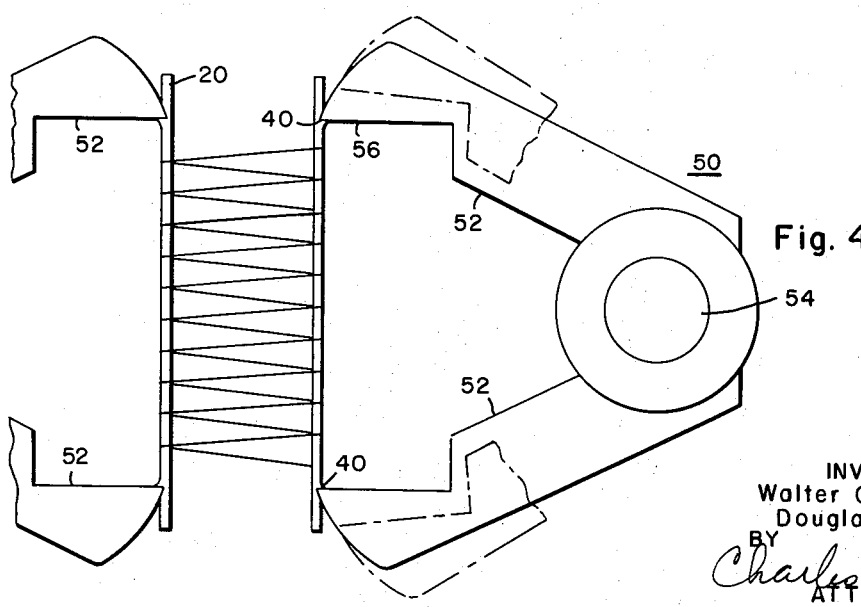

In FIG. 4, there is illustrated a forming apparatus 50 which includes two forming or cutting tools 52 which are mounted on a pivot pin 54. Simultaneously movement of the forming tool 52 inwardly forms the locating shoulder both on the top and bottom end of the grid side rod. Similar apparatus is provided on the opposite side of the grid 20 to provide similar locating shoulders simultaneously on the other side rod of the grid 20. Means is provided to accurately position and hold the grid 20 with respect to the cutting members 52 so that the side rods are properly positioned with respect to the cutting apparatus to accurately position the shoulder with respect to the laterals.

In FIG. 4, the forming tool 52 is illustrated at the point of final cut which indicates that the leading surface 56 of the cutting tool is in a plane perpendicular to the longitudinal axis of the grid side rod so as to form the locating shoulder 40 also perpendicular to the longitudinal axis of the side rod. The dotted forming tool 52 illustrates the retracted position of the forming tool 52 prior to cutting.

While we have shown our invention in only one form, it will be obvious to those skilled in the art that it is not so limited but is susceptible of various other changes and modifications without departing from the spirit and scope thereof.

We claim as our invention:

1. An electron discharge device comprising a plurality of electrodes including a grid electrode having two parallel support rods, an insulating spacer engaging the ends of said electrodes to hold the electrodes in an insulated spaced relation, means for securing one end of at least one of said support rods of said grid electrode in an aperture provided in said spacer to prevent longitudinal movement, said aperture being of sufficient dimensions to receive said support rod, said securing means comprising a projection from said support rod spaced from one end of said rod and a contact surface on said projection in contact with one side of said spacer, said contact surface lying in a plane substantially normal to the longitudinal axis of said support rod and formed by a chisel-like cut made into said support rod to form a notch therein and to displace material from said notch forming said projection on said support rod.

2. An electron discharge device comprising an anode, a cathode, a first and second grid and spaced insulator spacers having apertures therein, said first and second grids each having a pair of spaced grid supporting elements having a plurality of lateral wires wound thereon, said supporting elements extending through apertures provided in said spacers, said supporting elements of a diameter less than the diameter of said apertures in said spacers, a stop portion provided on said supporting elements between said lateral grid wires and said spacers to position said support elements with respect to said spacers, said stop portion comprising an integral projection from said supporting elements to provide a planar surface substantially perpendicular to the axis of said supporting elements adjacent the plane of the insulator whereby said stop portion is effective for positioning said lateral wires on said first grid with respect to the lateral wires on said second grid.

3. An electron discharge device comprising a plurality of electrodes including a grid electrode having two parallel support side rods, upper and lower spacer members for maintaining the relative position of said electrodes, said upper spacer provided with apertures of larger dimensions than said support rods through which said support rods extend, said support rods being positioned with respect to said upper spacer by means of a projection member on said support rods formed therein to make contact with the lower surface of said upper spacer through which said support rod extends, said projection member formed by making a chisel-like cut into said side rod at an acute angle with respect to the longitudinal axis of said support rod to form a notch in said side rod and an integral projection extending beyond the surface of said support rod, said notch having one surface substantially normal to the longitudinal axis of said support rod and lying in a common plane to the surface of said projection member making contact with the lower surface of said upper spacer.

4. An electron discharge device comprising an electrode member having a pair of spaced parallel support side rods, a plurality of lateral grid wire turns provided about the central portion of said rods, a pair of insulating spacers between which said electrode is mounted, perforations in each of said spacers in alignment with each of said side rods, said perforations being large enough to receive said side rods, an integral positioning means provided on said rods between said lateral turns and the end of said rods to position said rods with respect to said spacers, said positioning means comprising a projection extending from said side rods and formed by making a chisel-like cut into said side rod members to form a notch and forcing material out of said notch region to form said projection, said projection providing a substantially planar surface substantially perpendicular to said support rods.

References Cited in the file of this patent

UNITED STATES PATENTS

| | | |
|---|---|---|
| 1,784,866 | Fahrenwald | Dec. 16, 1930 |
| 2,304,976 | Watter | Dec. 15, 1942 |
| 2,347,262 | Herzog | Apr. 25, 1944 |
| 2,539,096 | Miller | Jan. 23, 1951 |
| 2,829,298 | Gude | Apr. 1, 1958 |
| 2,913,616 | Ammenwerth et al. | Nov. 17, 1959 |
| 2,946,915 | Haase | July 26, 1960 |